March 19, 1929.   M. J. WISBY   1,705,797
AUTOMOBILE TRUNK HOLDER
Filed Sept. 27, 1926   2 Sheets-Sheet 1
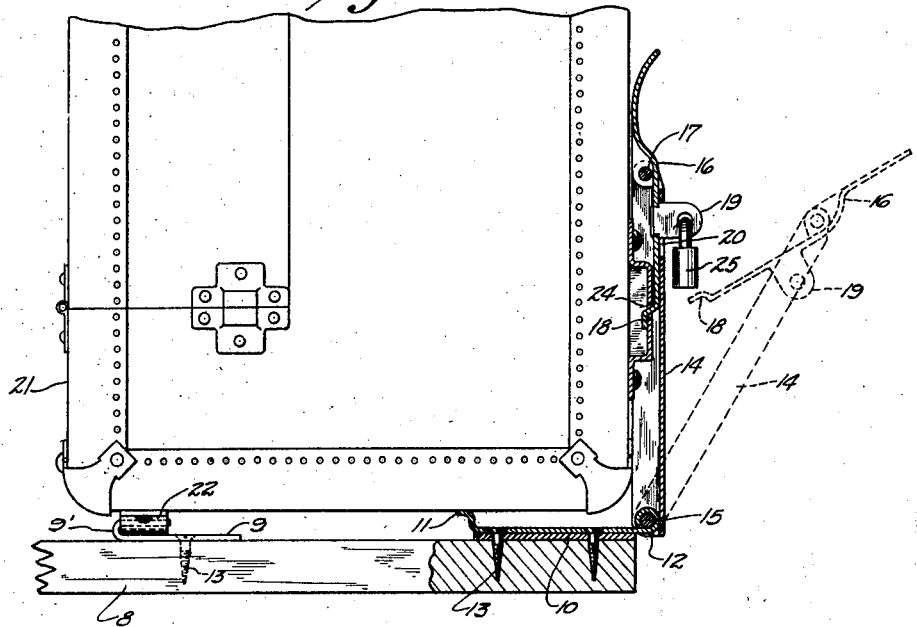
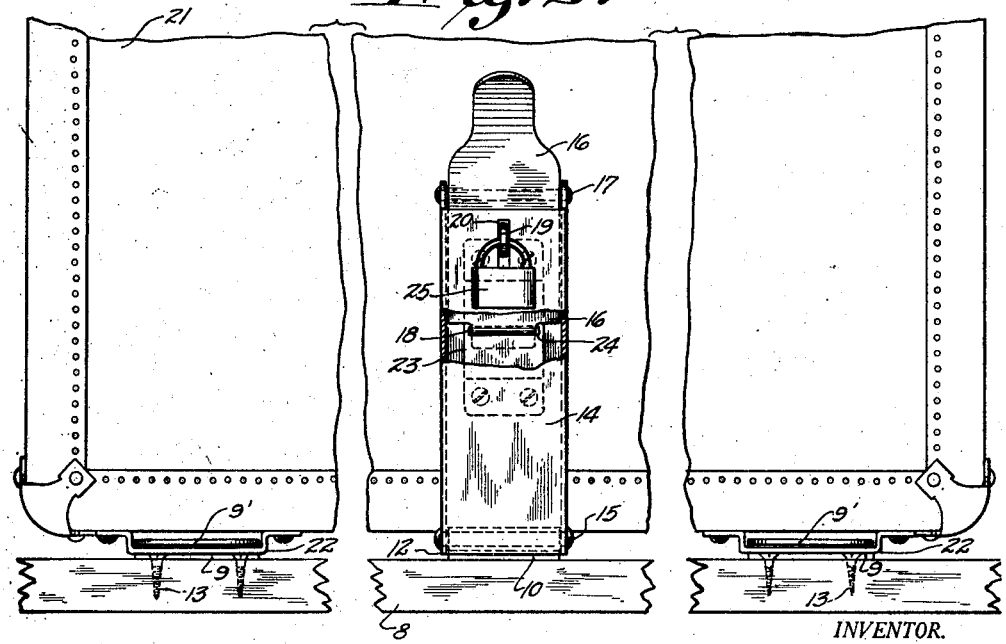
INVENTOR.
Marinus J. Wisby
BY
Morsell, Keeney & Morsell
ATTORNEYS March 19, 1929.  M. J. WISBY  1,705,797
AUTOMOBILE TRUNK HOLDER
Filed Sept. 27, 1926   2 Sheets-Sheet 2

INVENTOR.
Marina J. Wisby.
BY
Morrell, Keeney & Morrell
ATTORNEYS.

Patented Mar. 19, 1929.

1,705,797

UNITED STATES PATENT OFFICE.

MARIUS J. WISBY, OF RACINE, WISCONSIN, ASSIGNOR TO HARTMANN TRUNK COMPANY, OF RACINE, WISCONSIN, A CORPORATION OF WISCONSIN.

AUTOMOBILE TRUNK HOLDER.

Application filed September 27, 1926. Serial No. 138,041.

This invention relates to improvements in automobile trunk holders, more particularly adapted for running-board use.

In travelling in an automobile, it is desirable to carry a trunk, and more particularly a trunk of the wardrobe type, so that garments and other apparel will be preserved in good condition for wear, and easily accessible for use. It is also desirable to provide a holder which will permit the easy removal of the trunk from the running-board and the attaching of the trunk thereto whenever desired.

It is one of the objects of the present invention to provide a trunk holder which will permit the accomplishment of the before-mentioned desirable features in a very simple manner.

A further object of the invention is to provide an automobile trunk holder having means for firmly clamping the trunk in position before it is locked to the holder.

A further object of the invention is to provide an automobile trunk holder in which the clamping portion when not in use may be folded downwardly upon the running-board to an out of the way position.

A further object of the invention is to provide an automobile trunk holder which is of simple construction, is strong and durable, and is well adapted for the purpose described.

With the above and other objects in view, the invention consists of the improved automobile trunk holder and its parts and combinations as set forth in the claims, and all equivalents thereof.

In the accompanying drawings, in which the same reference characters indicate the same parts in all of the views:

Fig. 1 is an end view of an automobile running board provided with the improved holder, shown engaging a portion of a wardrobe trunk, the holder being shown partly in section and in dotted lines in an outer position;

Fig. 2 is a front view of the parts shown in Fig. 1, parts broken away and in section;

Figure 3:
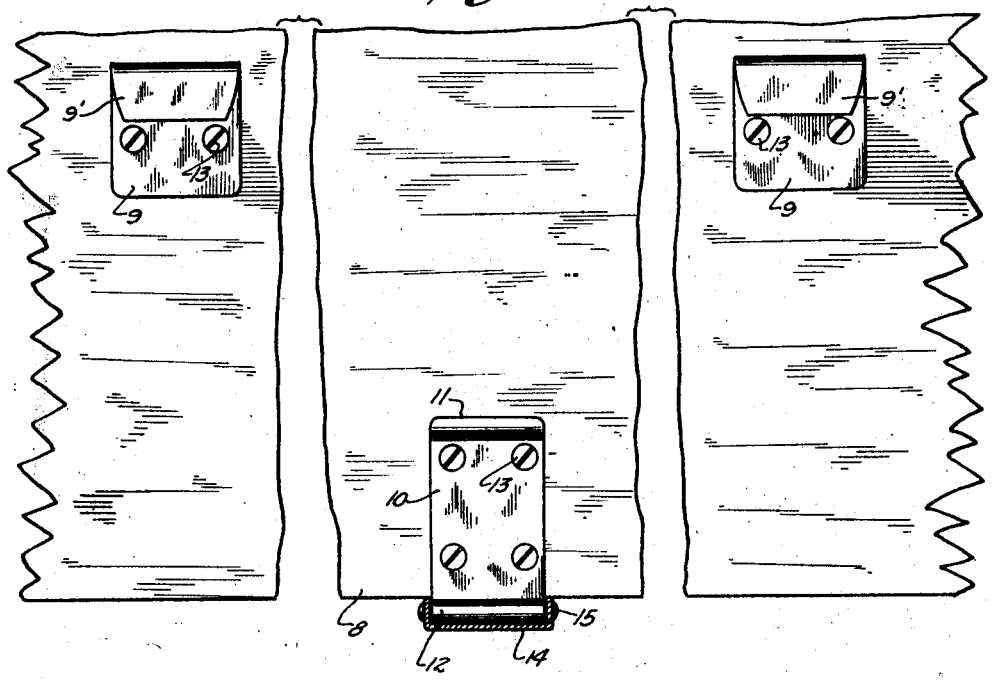
Fig. 3 is a top view of a portion of the running board with holder parts mounted thereon, a part being in section.

Referring to the drawings, the numeral 8 indicates the running-board of an automobile upon which is mounted two inner hooked shaped attaching plates or members 9 and an outer eyed plate or attaching member 10. The member 10 is also formed in two parts and is provided with an inwardly extending trunk supporting flange 11, while the eye 12 before mentioned, is formed on the outer edge portion of the plate. Said plates 9 and 10, while shown as secured to the running-board by screws 13, may be bolted or riveted, or secured in any other manner desired. A link 14 of U-shape in cross section is hinged to the eye 12 of the outer plate 10 by a hinge pin 15, and at its upper end carries a clamping lock lever 16 pivotally connected to the link 14 by a pivot pin 17. The lock lever 16 is formed with a lower locking shouldered hook 18 and is provided with a medial outwardly extending eyed portion 19 which projects through an elongated slot 20 in the link 14 when the parts are in locked position.

A wardrobe trunk 21 having two metal loop straps 22 mounted on its lower end near one side, is positioned on the running-board and slid inwardly, so that the hook portions 9' of the attaching plates 9 enter the loops of the straps 22 to hold the rear portion of the trunk firmly in place with the front or outer lower portion resting upon the supporting flange 11, as shown in Fig. 1. The outer side portion of the trunk has mounted thereon an escutcheon member 23 having a transversely extending elongated slot 24. The member 23 is positioned to extend into the space between the side flanges of the link 14 and permit the shouldered end 18 of the lock lever 16 to enter the elongated slot 24, and firmly clamp the trunk in position when the link 14 and the lever 16 are swung inwardly to full line position shown in Fig. 1.

Particular attention is directed to the toggle lever clamping action produced between the locking lever 16, the link 14 and the escutcheon member 23, which provides for firmly clamping the outer portion of the trunk to the running-board.

When the parts are in clamped position the eyed portion 19 will project through slot 20 of the link 14 and is locked by a padlock 25.

When the holder is not in use, the link 14 may be folded over on top of the running board with the shouldered portion 18 of the lock lever extending beneath the flange 11 and the parts locked in said position in the same manner as with a trunk.

Figure 4:
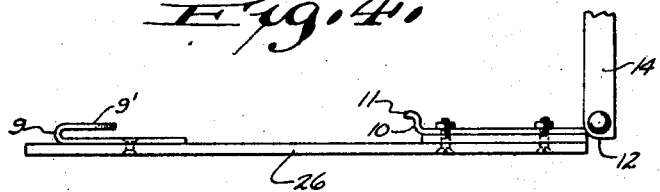
Fig. 4 is a side view of a modified form of construction.

In the modified form shown in Fig. 4, the parts 9 and 10 are mounted upon a metal plate 26 and the plate is then attached to the running board by screws or bolts (not shown).

From the foregoing description, it will be seen that the automobile trunk holder is of very simple construction and is well adapted to permit the trunk being quickly unlocked and removed from or locked to the running-board, and when locked the trunk will be firmly held in position.

What I claim as my invention is:

1. An automobile trunk holder, comprising attaching plates having means for connection with the upper side portion of the running-board of an automobile, members connectible to the side and bottom portion of a trunk to be mounted on the running board and some of said members engaging some of the attaching plates, a link non-removably pivotally connected to one of the attaching plates, and a locking lever pivotally connected to the free end portion of the link for clamping engagement with one of the trunk connecting members.

2. An automobile trunk holder, comprising attaching plates having means for connection with the running-board of an automobile, some of said plates having hook portions, strap loops connectible to the lower side portion of a trunk to be mounted on the running board for engagement with the hooks of the attaching plates, a slotted member mounted on a vertical side portion of the trunk, a link non-removably pivotally connected to one of the attaching plates, and a locking lever pivotally connected to the free end portion of the link and entering the trunk slotted member for clamping the trunk to the running-board.

3. The combination with a trunk and the running-board of an automobile, of a holder for connecting the two together, comprising hook plates mounted on the board, strap loops mounted on the lower portion of the trunk and through which the hooks of the plates extend, an attaching member mounted on the board, a link pivotally connected to the attaching member and having an opening, an escutcheon member mounted on the trunk and having an opening, and a locking lever pivotally connected to the free end of the link and having a shouldered end portion which enters the opening of the escutcheon member for clamping the trunk to the board, said lever also having an eyed portion which extends through the link opening to permit locking the parts together in closed position.

4. The combination with a trunk and the running-board of an automobile, of a holder for connecting the two together, comprising hook plates mounted on the board, strap loops mounted on the lower portion of the trunk and through which the hooks of the plates extend, an attaching member mounted on the board, a link pivotally connected to the attaching member and having an opening, an escutcheon member mounted on the trunk and having an opening, and a locking lever pivotally connected medially of its length to the free end portion of the link and having a shouldered end portion which enters the opening of the escutcheon member for clamping the trunk to the board, said lever also having an eyed portion which extends through the link opening to permit use of a padlock to lock the parts in closed position.

5. The combination with a trunk and the running-board of an automobile, of a holder for connecting the two together, comprising a pair of hook plates mounted on the inner portion of the board, a pair of strap loops mounted on the lower portion of the trunk and through which the hooks of the plates extend, an eyed attaching member mounted on the outer portion of the board, a U-shape in cross section link pivotally connected to the eye of the attaching member and having an elongated slot in its upper portion, an escutcheon member mounted on the trunk and having a transversely extending elongated slot, and a locking lever pivotally connected medially of its length to the free end portion of the link and having a shouldered lower end portion which enters the transverse opening of the escutcheon member for clamping the trunk to the board, said lever also having an eyed portion which extends through the link opening to permit use of a lock to lock the parts in closed position.

6. The combination with a trunk and the running board of an automobile, of a holder for connecting the two together, comprising a pair of hook plates mounted on the inner portion of the board, a pair of strap loops mounted on the lower portion of the trunk and through which the hooks of the plates extend, an eyed attaching member mounted on the outer portion of the board and having an inwardly extending flange, a U-shape in cross section link pivotally connected to the eye of the attaching member and having an elongated slot in its upper portion, an escutcheon member mounted on the trunk and having a transversely extending elongated slot, and a locking lever pivotally connected medially of its length to the free end portion of the link and having a shouldered lower end portion which enters the transverse opening of the escutcheon member for clamping the trunk to the board, said lever also having an eyed portion which extends through the link opening to permit use of a lock to lock the parts in closed position, the shouldered lower end portion of the locking lever being also engageable with the inwardly extending flange to permit locking the parts in folded position.

In testimony whereof, I affix my signature.

MARIUS J. WISBY.